J. G. NOLEN & J. SHEPHERD.
VEHICLE SPRING.
APPLICATION FILED DEC. 20, 1906.
899,837.
Patented Sept. 29, 1908.
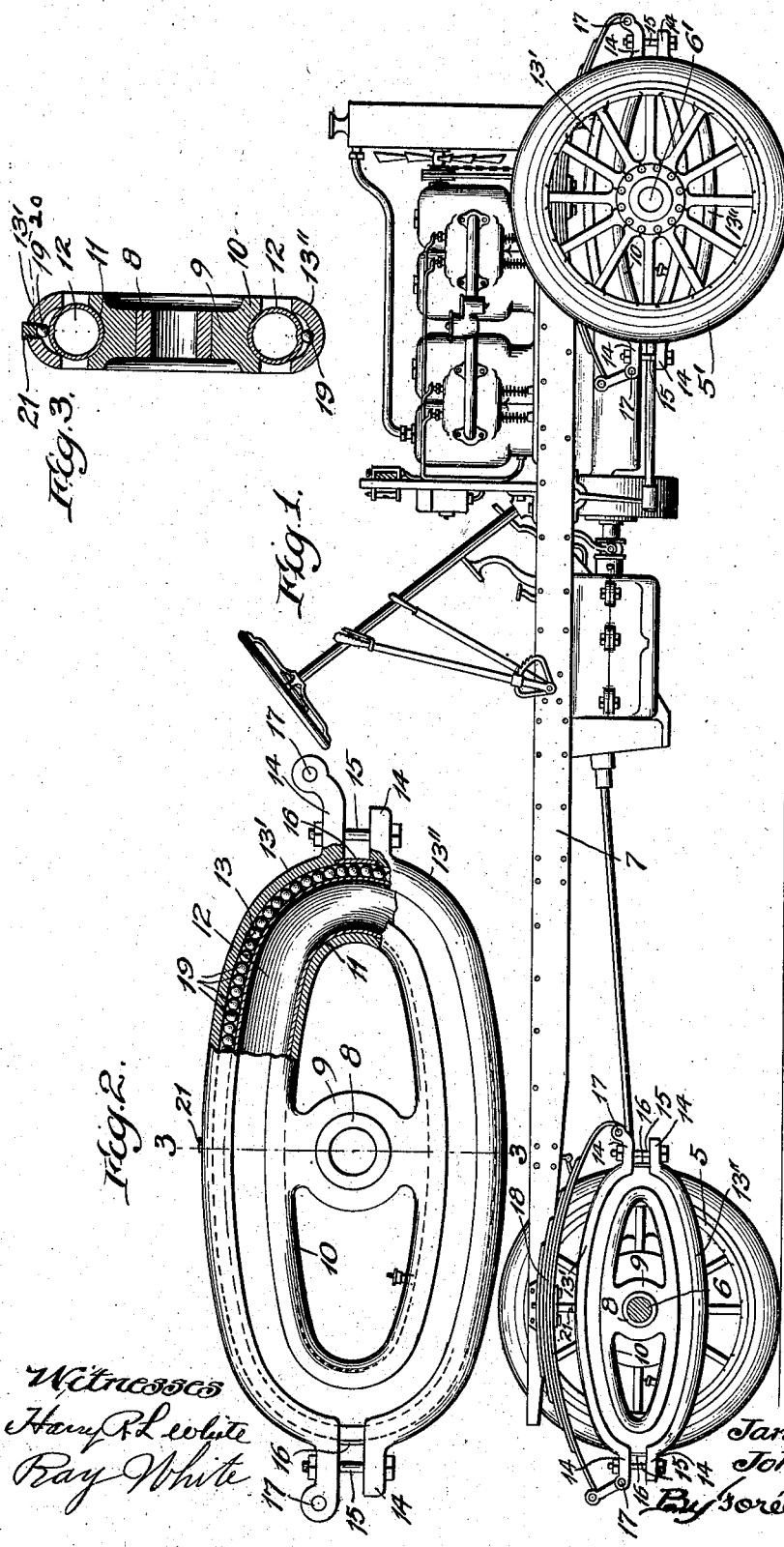
Witnesses
Harry R. L. White
Ray White
Inventors
James G. Nolen and
John Shepherd
By Foree Bain & May
Attys

UNITED STATES PATENT OFFICE.

JAMES G. NOLEN AND JOHN SHEPHERD, OF CHICAGO, ILLINOIS; SAID NOLEN ASSIGNOR TO JOHN E. SHEPHERD, OF CHICAGO, ILLINOIS.

VEHICLE-SPRING.

No. 899,837.  Specification of Letters Patent.  Patented Sept. 29, 1908.

Application filed December 20, 1906. Serial No. 348,685.

*To all whom it may concern:*

Be it known that we, JAMES G. NOLEN and JOHN SHEPHERD, citizens of the United States, residing at Chicago, in the county of Cook and State of Illinois, have invented certain new and useful Improvements in Vehicle-Springs, of which the following is a specification.

Our invention relates to improvements in vehicle springs, and has for its salient object to provide a spring construction for interposition between the running gear and the body of a vehicle which will minimize the vibrations imparted to the vehicle body.

A further object of our invention is to provide an improved and practically-advantageous construction involving as a shock-absorbing medium a resilient, inflated cushion.

A yet further object of our invention is to provide a construction which will enhance the sensitiveness of such cushion. And other and further objects of our invention will become apparent to those skilled in the art from the following description taken in conjunction with the accompanying drawing, wherein:

Figure 1 is a side elevation of an automobile chassis equipped with our invention, and having its rear axle partly cut away. Fig. 2 is an enlarged elevation, with parts in section, of our improved cushion structure. Fig. 3 is a transverse section on line 3—3 of Fig. 2.

Throughout the drawing like numerals of reference refer always to like parts.

In the drawing 5 and 5' indicate respectively the rear and front wheels; 6 and 6' the rear and front axles and 7 the frame of an automobile.

In our preferred construction we provide intermediate each axle and the frame two spring cushioning devices, one at each side of the frame.

In the construction shown 8 indicates a body of rubber or other resilient material surrounding the axle, and itself surrounded by a ring 9 constituting part of a central support or bearing part comprising an elliptical casting 10, the perimeter of which is grooved, as indicated at 11. In the groove 11 is seated an inflatable air cushion 12, preferably in the form of a continuous tube, of suitable diameter, and surrounding the tube is provided a strap or shoe 13, constituting an opposing bearing part. The strap 13 is preferably made in two major pieces 13', 13'', provided with out-turned ends 14 through which take the connecting bolts 15 joining the parts of the band together. That the band 13 may internally present a continuous surface we provide short plates 16 for spanning the gaps between the parts 13' and 13''. The projections 14 of the part 13' are preferably extended and provided with apertured heads 17 to which are connected, in any suitable manner, the opposite ends of the semi-elliptical spring 18, centrally secured in any approved fashion to the frame 7. Further we prefer that the contact effected between the pneumatic member and one of its associated metallic casing elements shall be variable as to area, and to this end we provide a structure such that the tube has bearing normally only at a number of separated points. To this end we prefer that there be interposed between the band or shoe 13 and the tube 12 a series of balls, indicated at 19, preferably extending around the entire perimeter of the tube 12. To permit of the insertion of the balls 19 in a simple manner we preferably provide in the upper band section 13' an aperture 20 closed by a screw plug 21, and of suitable size to admit of the balls 19.

It will be seen that our improved cushion arrangement provides at each corner of the vehicle, supplementing the action of a semi-elliptical spring, an elliptical cushioning device, wherein the cushioning part is an air filled tube of relatively large internal area, so disposed as to present its maximum linear dimensions longitudinally of the machine, and arranged in a vertical plane, so that it is susceptible of readily taking up shocks that would otherwise be imparted to the vehicle; and furthermore it will be apparent that the interposition of the balls 19 between the surrounding strap and the cushion-tube reduces the normal area of contact between the parts in such a degree as to render the device very sensitive. Upon receiving a shock from an obstruction in the path of a wheel, it will be seen that the sudden application of pressure to the axle 6 and through the surrounding cushion 8 to the casting 10, forces the upper leg of the tube 12 upward, so that its surface is abnormally indented by the balls 19, which tend to indent more deeply the tube and thereby to increase the superficial area of contact between the tube and the encircling strap. Obviously further the elliptical spring 18 and the rubber body 8 also tend to take up a portion of the shock.

While we have herein described in some detail a specific embodiment of our invention, we do not desire to be understood as limiting ourselves to the specific construction shown and described further than as specified in the claims.

Having thus described our invention, what we claim and desire to secure by Letters Patent, of the United States, is:

1. In combination with the running gear and frame of a vehicle, a supporting member connected with the running gear, an air cushion bearing upon said supporting member, an overlying member connected with the frame, and balls interposed between one of said members and the cushion bearing directly on the cushion, to sink therein when under excess of pressure.

2. In combination with the running gear and frame of a vehicle, a supporting structure connected with the running gear, an opposing structure connected with the body, and an elastic cushion interposed between said structures and connecting with one thereof at separated points only.

3. In combination with the running gear and frame of a vehicle, similar concentric members one connected with the frame and the other with the running gear, an air cushion between said members, and balls interposed between one of said members and the cushion and bearing directly on the cushion to sink therein to an extent when under excess of pressure.

4. A cushioning device of the character described comprising a central member, an encircling pneumatic cushion, a separable, elliptic band encircling the cushion, and a series of balls interposed between said cushion and said band.

5. In a vehicle, the combination with a running gear and a frame of a cushioning device comprising bearing parts associated respectively with the running gear and frame, an interposed air cushion and balls interposed between and bearing upon one of said bearing parts and the cushion.

6. In combination with the running gear and frame of a vehicle, a supporting member connected with the running gear, an air cushion bearing upon said supporting member, and overlying parts, wherewith said cushion member coacts at separated points only, connected with the frame.

In testimony whereof we hereunto set our hands.

JAMES G. NOLEN.
JOHN SHEPHERD.

In the presence of—
GEO. T. MAY, Jr.,
MARY F. ALLEN.